US010097446B2

(12) United States Patent
Torvi

(10) Patent No.: US 10,097,446 B2
(45) Date of Patent: *Oct. 9, 2018

(54) DYNAMIC AREA FILTERING FOR LINK-STATE ROUTING PROTOCOLS

(71) Applicant: Juniper Networks, Inc., Sunnyvale, CA (US)

(72) Inventor: Raveendra Torvi, Nashua, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,550

(22) Filed: Feb. 8, 2016

(65) Prior Publication Data

US 2016/0173363 A1    Jun. 16, 2016

Related U.S. Application Data

(62) Division of application No. 14/042,724, filed on Oct. 1, 2013, now Pat. No. 9,258,210.

(51) Int. Cl.
*H04L 12/28* (2006.01)
*H04L 12/715* (2013.01)
(Continued)

(52) U.S. Cl.
CPC .......... *H04L 45/04* (2013.01); *H04L 41/0813* (2013.01); *H04L 45/02* (2013.01); *H04L 45/12* (2013.01); *H04L 45/32* (2013.01)

(58) Field of Classification Search
USPC .......... 370/392, 401, 395.3, 395.31
See application file for complete search history.

(56) References Cited

U.S. PATENT DOCUMENTS 6,473,421 B1    10/2002    Tappan
7,420,958 B1    9/2008    Marques
(Continued)

FOREIGN PATENT DOCUMENTS

CN        1607790 A        4/2005
CN       101019372 A       8/2007
(Continued)

OTHER PUBLICATIONS

Network Working Group, RFC 2370, Jul. 1998, p. 1-13.*
(Continued)

*Primary Examiner* — Phuongchau Ba Nguyen
(74) *Attorney, Agent, or Firm* — Shumaker & Sieffert, P.A.

(57) ABSTRACT

In general, techniques are described for dynamically filtering, at area border routers (ABRs) of a multi-area autonomous system, routes to destinations external to an area by advertising to routers of the area only those routes associated with a destination address requested by at least one router of the area. In one example, a method includes receiving, by an ABR that borders a backbone area and a non-backbone area of a multi-area autonomous system that employs a hierarchical link state routing protocol to administratively group routers of the autonomous system into areas, a request message from the non-backbone area that requests the ABR to provide routing information associated with a service endpoint identifier (SEI) to the non-backbone area. The request message specifies the SEI. The method also includes sending, in response to receiving the request and by the ABR, the routing information associated with the SEI to the non-backbone area.

16 Claims, 6 Drawing Sheets

(51) Int. Cl.
*H04L 12/751* (2013.01)
*H04L 12/24* (2006.01)
*H04L 12/721* (2013.01)

(56) References Cited

U.S. PATENT DOCUMENTS

| | | | |
|---|---|---|---|
| 7,751,405 B1 | 7/2010 | Kompella | |
| 7,865,615 B2 | 1/2011 | Mirtorabi et al. | |
| 7,903,554 B1* | 3/2011 | Manur | H04L 45/026 370/230.1 |
| 8,611,359 B1 | 12/2013 | Kompella et al. | |
| 8,717,899 B2* | 5/2014 | Boutros | H04L 41/06 370/236 |
| 9,258,210 B2 | 2/2016 | Torvi et al. | |
| 2003/0014540 A1 | 1/2003 | Sultan et al. | |
| 2004/0148520 A1* | 7/2004 | Talpade | H04L 63/1458 726/22 |
| 2005/0083964 A1 | 4/2005 | Tatman et al. | |
| 2005/0262264 A1 | 11/2005 | Ando et al. | |
| 2006/0039391 A1 | 2/2006 | Vasseur et al. | |
| 2006/0092952 A1 | 5/2006 | Boutros et al. | |
| 2006/0101142 A1 | 5/2006 | Vasseur et al. | |
| 2006/0291446 A1 | 12/2006 | Caldwell et al. | |
| 2007/0121503 A1 | 5/2007 | Guo et al. | |
| 2007/0214275 A1* | 9/2007 | Mirtorabi | H04L 45/04 709/230 |
| 2007/0258447 A1 | 11/2007 | Raszuk et al. | |
| 2008/0107107 A1* | 5/2008 | Shen | H04L 45/04 370/389 |
| 2009/0016365 A1 | 1/2009 | Sajassi et al. | |
| 2009/0028148 A1 | 1/2009 | Cao et al. | |
| 2009/0041037 A1* | 2/2009 | Yang | H04L 45/02 370/401 |
| 2009/0103538 A1 | 4/2009 | Yoshimi | |
| 2010/0329270 A1 | 12/2010 | Asati et al. | |
| 2011/0228785 A1 | 9/2011 | Filsfils et al. | |
| 2011/0235545 A1 | 9/2011 | Subramanian et al. | |
| 2012/0167160 A1 | 6/2012 | Carney et al. | |
| 2012/0224506 A1 | 9/2012 | Gredler et al. | |
| 2012/0308225 A1 | 12/2012 | Long et al. | |
| 2012/0317307 A1* | 12/2012 | Ravindran | H04L 12/6418 709/238 |
| 2013/0039214 A1 | 2/2013 | Yedavalli et al. | |
| 2013/0110987 A1* | 5/2013 | Kim | H04L 45/02 709/219 |
| 2015/0117265 A1 | 4/2015 | Li et al. | |

FOREIGN PATENT DOCUMENTS

| | | |
|---|---|---|
| CN | 101401083 A | 4/2009 |
| EP | 2151959 A1 | 2/2010 |

OTHER PUBLICATIONS

Moy, "OSPF Version 2," Network Working Group, RFC 2828, Apr. 1998, 188 pp.

Berger, et al., "The OSPF Opaque LSA Option," Network Working Group, RFC 5250, Jul. 2008, 18 pp.

International Standards Organization, "Information Technology—Telecommunications and Information Exchange Between Systems—Intermediate System to Intermediate System Intra-domain Routeing Information Exchange Protocol for Use in Conjunction with the Protocol for Providing the Connectionless-Mode Network Service (ISO 8473)," ISO/IEC 10589:2002, dated Nov. 15, 2002, 210 pgs.

European Search Report from counterpart European Application No. 14186986.7-1857, dated Apr. 8, 2015, 6 pp.

Patel et al., "Service Advertisement using BGP", draft-keyupate-bgp-services-02.txt, Network Working Group, Apr. 26, 2013, 12 pp.

Pillay-Esnault, et al., "Service Distribution using OSPF," draft-pillay-esnault-ospf-service-distribution-02, Jul. 15, 2013, 16 pp.

European Search Report from counterpart European Application No. 14186986.7-1857, dated Apr. 1, 2016, 6 pp.

Zhang, et al., "RSVP Path computation request and reply messages," Network Working Group, Jul. 2004, 31 pp.

U.S. Patent Prosecution from U.S. Appl. No. 14/042,724, dated Oct. 19, 2015, 42 pp.

Response to Examination Report dated Feb. 18, 2016, from counterpart European Application No. 14186986.7, filed Jul. 22, 2016, 3 pp.

Examination Report from counterpart European Application No. 14186986.7, dated Jan. 2, 2018, 5 pp.

Response to Examination Report dated Jan. 2, 2018, from counterpart European Application No. 14186986.7, filed May 1, 2018, 15 pp.

Moy, "OSPF Version 2," RFC 2328, Network Working Group, Apr. 1998, 244 pp.

Summary of Office Action from counterpart Chinese Application No. 201410521496.7, dated Jul. 3, 2018, 1 pp.

* cited by examiner

DYNAMIC AREA FILTERING FOR LINK-STATE ROUTING PROTOCOLS

This application is a divisional of U.S. patent application Ser. No. 14/042,724 filed Oct. 1, 2013, the entire contents of which is incorporated herein by reference.

TECHNICAL FIELD

The disclosure relates to computer networks and, more specifically, to routing protocols used by computer networks.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form.

Certain devices within the network, referred to as routers, use routing protocols to exchange and accumulate topology information that describes the network. This allows a router to construct its own routing topology database of the network. Upon receiving an incoming data packet, the router examines keying information within the packet and forwards the packet in accordance with the topology information in the topology database.

Many routing protocols use flooding-based distribution mechanisms to announce topology information to routers within the network. These routing protocols typically rely on routing algorithms that require each of the routers to have synchronized routing topology information. That is, flooding-based routing protocols require that all routers in the routing domain store, to the routers' respective topology databases, all of the routing information that has been distributed according to the protocol. In this way, the routers are able to select routes that are consistent and loop-free. Further, the ubiquity of the routing information allows the flooding process to be reliable, efficient and guaranteed to terminate. In operation, each router typically maintains an internal topology (or "link-state") database and scans the entire database at a defined interval to generate and output link state messages so as to synchronize the database to neighboring routers within the routing domain. In this way, link state is propagated across the entire routing domain and stored in full at each router within the domain.

For example, Open Shortest Path First (OSPF) and Intermediate System to Intermediate System (IS-IS) routing protocols are link state protocols that use link state messages to ensure their routing topology is synchronized with respect to available interfaces, metrics and other variables associated with network links. OSPF utilizes Link State Advertisements (LSAs) while IS-IS uses Link State Protocol Data Units (LSPs) to exchange information. A router generating a link state message typically floods the link state message throughout the network such that every other router receives the link state message. In network topologies where routers are connected by point-to-point connections, each router floods link state messages to adjacent routers reachable on each interface to ensure synchronization. For a network using multi-access media, such as an Ethernet network, the routers within the network flood the link state messages to all other routers connected to the network. In either case, the receiving routers construct and maintain their own network topologies using the link information received via the link state messages. IS-IS is specified in "Intermediate system to Intermediate system routing information exchange protocol for use in conjunction with the Protocol for providing the Connectionless-mode Network Service (ISO 8473)," ISO, ISO/IEC 10589:2002, the entire contents of which is incorporated herein by reference. OSPF is described in "OSPF Version 2," IETF Network Working Group, Request for Comments 2828, April 1998, which is incorporated by reference in its entirety.

OSPF networks in an autonomous system (AS) may be administratively grouped into areas. Each area within an AS operates like an independent network and has a unique 32-bit area identifier (area ID), which functions like an Internet Protocol (IP) address. Area IDs are unique numeric identifiers, often expressed in dot-decimal notation, but they are not IP addresses. Within an area, the topology database contains only topology information for the area, LSAs are flooded only to routers within the area, and routers compute routes only within their respective areas. Sub-networks ("subnets") are divided into other areas, which are connected to form the whole of the autonomous system.

The central area of an AS, called the backbone area, has a special function and is always assigned the area ID 0.0.0.0. (i.e., Area 0). All other networks or areas in the AS are directly connected to the backbone area by a router that has interfaces in more than one area. These connecting routers are called area border routers (ABRs).

Because all areas are adjacent to the backbone area, an OSPF router sends all traffic not destined for the router's own area through the backbone area. The ABRs in the backbone area are then responsible for transmitting the traffic through to the appropriate ABR to the destination area. The ABRs summarize the link-state records of each area and advertise destination address summaries to neighboring areas. The advertisements contain the area ID of the area in which each destination lies, so that packets are routed to the appropriate ABR.

An OSPF restriction requires all areas to be directly connected by physical or virtual links to the backbone area so that packets can be properly routed. All packets are routed first to the backbone area by default. Packets that are destined for an area other than the backbone area ("non-backbone areas") are then routed from the receiving backbone area ABR to an appropriate backbone area ABR with an interface to the destination area and then on to the remote host within the destination area.

SUMMARY

In general, techniques are described for dynamically filtering, at area border routers (ABRs) of a multi-area autonomous system, routes to destinations external to an area by advertising to routers of the area only those routes associated with a destination address requested by at least one router of the area. In some examples, provider edge (PE) routers of an autonomous system provide reachability to services and may, using a gateway protocol (e.g., Border Gateway Protocol (BGP)) session, exchange service endpoint identifiers, such as Internet Protocol (IP) addresses for the PE routers, to announce their availability as a service endpoint to one or more services. For instance, a PE router that is a member of an area may receive, in a BGP session, a service endpoint identifier for services reachable by a remote PE router that is a member of a different area. In order to determine a path to the remote PE router and thereby reach the service endpoint represented by the remote PE router, the PE router requests that an ABR for the area provide to the PE router any routing information that has been received from the backbone area and that is associated with the service endpoint identifier. As one example, a prefix that includes the service interfaces may have for a next hop (as specified, e.g., by a BGP NEXT_HOP attribute) a service endpoint identifier that is a router identifier (e.g. a loopback IP address) for the remote PE router. Accordingly, the PE router may request that the ABR provide routing information associated with the router identifier for the remote PE router.

The ABR for the area and having an interface to the PE router may be configured to filter, by default, all routes to destinations external to the area such that the other routers in the area do not, according to the default configuration, receive such routes from the ABR. However, upon receiving the request to provide to the PE router any routing information that has been received from the backbone area and that are associated with the service endpoint identifier, the ABR installs a permit filter that directs the ABR to advertise such routing information within the area that includes the PE router. Continuing the above example, the ABR may advertise routing information associated with the router identifier for the remote PE router. As a result, the PE router may receive routing information for the remote PE router to enable the PE router to compute a Shortest-Path First calculation of a path to the remote PE router for forwarding IP or Label Distribution Protocol (LDP) traffic, for instance, toward the services reachable by the remote PE router.

By employing this filtering model, area border routers of a multi-area autonomous system may reduce a number of routes advertised into non-backbone areas, which may improve route-convergence and lead to reduced resource consumption among the non-ABR area routers. For example, router for an area that is not an ABR may not receive all Summary and AS-external LSAs originated by routers external to the area and may thereby avoid adding such LSAs to its topology database while still enabling receipt of area-external routes of interest upon request. The bandwidth usage of the area may also be reduced by avoiding flooding of irrelevant LSAs.

In one aspect, a method includes receiving, by a router, a service endpoint identifier for a remote router that provides reachability to a service, wherein the router is logically located in a non-backbone area of a multi-area autonomous system that employs a hierarchical link state routing protocol to administratively group routers of the autonomous system into areas, and wherein the remote router is logically located external to the non-backbone area. The method also includes generating, by the router, a request message that requests an area border router for the non-backbone area to provide routing information associated with the service endpoint identifier to the non-backbone area in accordance with the link state routing protocol. The method also includes sending, by the router, the request message to the non-backbone area.

In another aspect, the method includes receiving, by an area border router that borders a backbone area and a non-backbone area of a multi-area autonomous system that employs a hierarchical link state routing protocol to administratively group routers of the autonomous system into areas, a request message from the non-backbone area that requests the area border router to provide routing information associated with a service endpoint identifier to the non-backbone area, wherein the request message specifies the service endpoint identifier. The method also includes sending, in response to receiving the request and by the area border router, the routing information associated with the service endpoint identifier to the non-backbone area.

In another aspect, a router includes a control unit comprising a processor, a network interface card, and a management interface executed by the control unit and configured to receive configuration information that configures the router as logically located in a non-backbone area of a multi-area autonomous system that employs a hierarchical link state routing protocol to administratively group routers of the autonomous system into areas. The router also includes a Border Gateway Protocol (BGP) module executed by the control unit and configured to receive a service endpoint identifier for a remote router that provides reachability to a service, wherein the remote router is logically located external to the non-backbone area. The router also includes a link state protocol module executed by the control unit and configured to execute the hierarchical link state routing protocol, wherein the link state protocol module is further configured to generate a request message that requests an area border router for the non-backbone area to provide routing information associated with the service endpoint identifier to the non-backbone area in accordance with the link state routing protocol, and wherein the link state protocol module is further configured to send, via the network interface card, the request message to the non-backbone area.

In another aspect, a router includes a control unit comprising a processor, a network interface card, and a management interface executed by the control unit and configured to receive configuration information that configured the router to operate as an area border router that borders a backbone area and a non-backbone area of a multi-area autonomous system that employs a hierarchical link state routing protocol to administratively group routers of the autonomous system into areas. The router also includes a link state protocol module executed by the control unit and configured to receive a request message from the non-backbone area that requests the area border router to provide routing information associated with a service endpoint identifier to the non-backbone area, wherein the request message specifies the service endpoint identifier, wherein the link state protocol module is further configured to send, in response to receiving the request and via the network interface card, the routing information associated with the service endpoint identifier to the non-backbone area.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
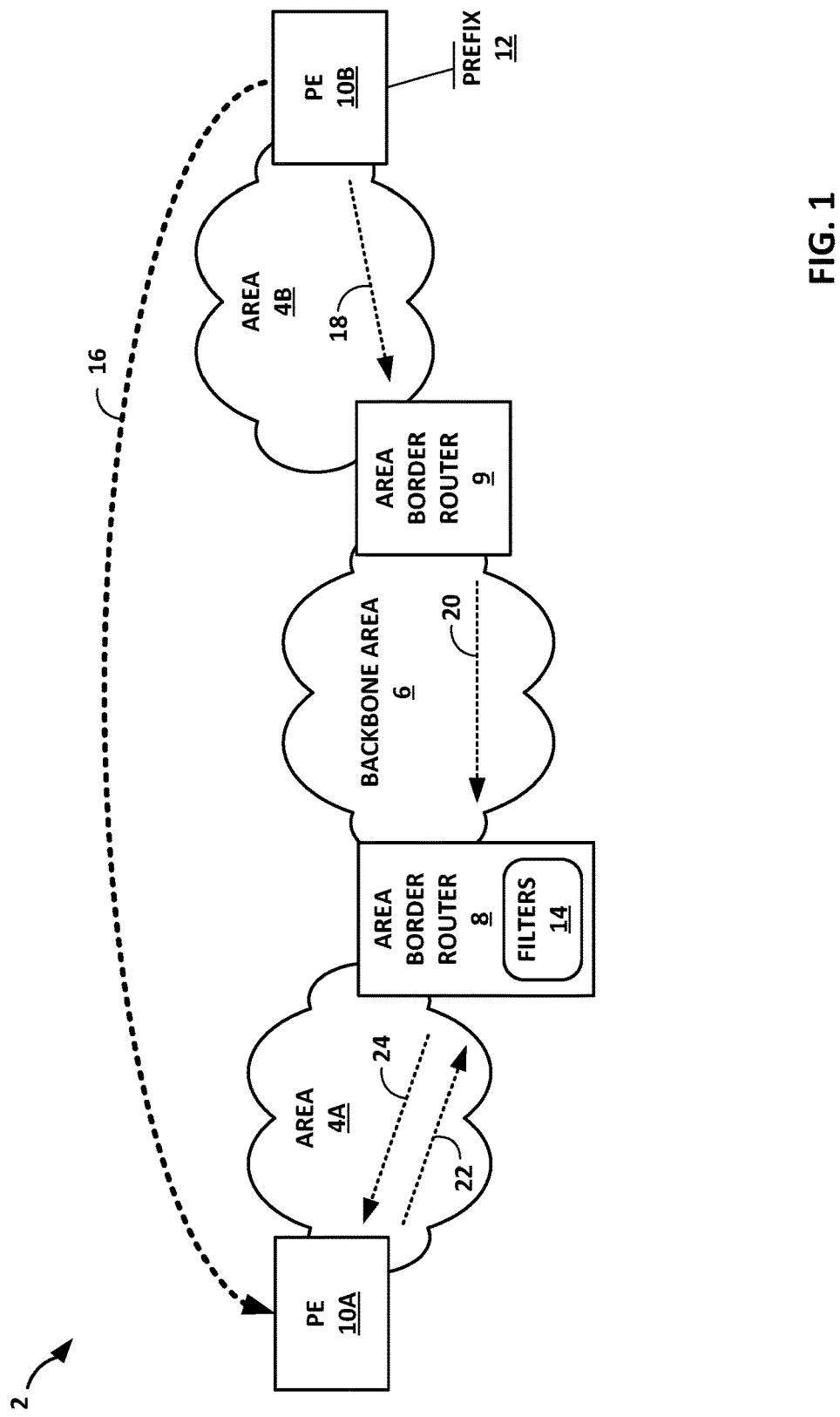
FIG. 1 is a block diagram illustrating an example multi-area autonomous system that employs a link state routing protocol and area border router that dynamically filters link state advertisements according to techniques described in this disclosure.

FIG. 1 is a block diagram illustrating an example multi-area autonomous system 2 that employs a link state routing protocol and area border router 8 that dynamically filters link state advertisements according to techniques described in this disclosure. Example link state routing protocols that may be employed by multi-area autonomous system 2 ("AS 2") as an Interior Gateway Protocol (IGP) include Open Shortest Path First (OSPF) and Intermediate System to Intermediate System (IS-IS). In the illustrated example, AS 2 includes three areas, backbone area 6 ("backbone 6") and non-backbone areas 4A-4B, administratively configured to each operate as an independent network using the link state routing protocol. In other words, each of the three areas 4A, 4B, and 6 runs its own instance of the link-state routing protocol algorithm and thus each area may have a different link-state database and corresponding topology graph. However, each of areas 4A, 4B and 6 may be described as within a single overall IGP routing domain of autonomous system 2. Each of areas 4A, 4B, and 6 may be associated with a different area identifier. In instances in which the link-state routing protocol is OSPF, the area identifier for backbone area 6 is the 32-bit integer 0.0.0.0 (as expressed in dot-decimal notation).

Backbone 6 is the "central area" of the AS 2 and includes all of the area border routers (ABRs) of AS 2-ABR 8 and ABR 9 in this example. Backbone 6 specially functions among the AS 2 areas to distribute routing information between non-backbone areas 4A, 4B. Backbone 6 is physically and/or virtually contiguous.

Area border router 8 is attached to both area 4A and backbone 6 and condenses topology information for area 4A for distribution to backbone 6. Area border router 9 is attached to both area 4B and backbone 6 and condenses topology information for area 4B for distribution to backbone 6. Area border routers 8, 9 distribute condensed topology information to respective areas 4A, 4B. As described herein, connections between routers that exchange link state messages may include point-to-point (P2P), broadcast multi-access (BMA), and/or non-broadcast multi-access (NBMA) connections.

Provider edge (PE) router 10A is an internal router of area 4A. That is, all networks directly connected to PE router 10A are part of area 4A. PE router 10B is an internal router of area 4B. Any of PE routers 10A-10B (collectively, "PE routers 10") may be an autonomous system boundary router (ASBR). In some instances, PE router 10B may also or alternatively be an area boundary router. PE router 10B includes an interface for a network configured with prefix 12, which may represent an IPv4 or IPv6 prefix.

Each of PE routers 10 is deployed by a service provider or enterprise to provide edge services to customers. PE routers 10 interface to customer networks to offer support for the edge services, which may include Layer 3 Virtual Private Networks (L3VPN), a Virtual Private Local Area Network (LAN) Service (VPLS), and/or Virtual LAN (VLAN). PE router 10B, for example, may represent a service endpoint for any of these services and so provide reachability to customer networks connected to PE router 10B that engage the service. A service endpoint identifier for the service endpoint represented by PE router 10B may therefore be a router identifier for PE router 10B, such as a loopback IP address.

PE router 10B as an internal router of area 4B advertises to other routers of area 4B including ABR 9, using advertisement 18, routing information including a router identifier for PE router 10B and in some cases the states of the interfaces of PE router 10B connected to routers in area 4B. The PE router 10B router identifier may be a configured IP address, a unicast IP address configured on a loopback interface for the router (i.e., a "loopback" or "local" IP address), or an IP address of one of the interfaces of the router. Advertisement 18 may be flooded. In some instances, advertisement 18 represents a Router-LSA (OSPF Type 1 LSA). In general, a Router-LSA describes the collected states of a router's interfaces to an area to which it is flooded. All OSPF LSAs begin with a common 20-byte header that includes the router identifier for the advertising router. In instances in which advertisement 18 represents a Router-LSA, the advertising router may include the value for the router identifier for PE router 10B.

ABR 9 stores the routing information received in advertisement 18 to a link-state database for the link-state protocol. ABR 9 distributes, using advertisement 20, at least the router identifier of PE router 10B in its link-state database to other routers of backbone 6 including ABR 8, which stores the routing identifier of PE router 10B to its own link-state database. Advertisement 20 may be flooded by router 9 and receiving routers out their interfaces. In some instances, advertisement 20 represents a Summary-LSA (OSPF Type 3 LSA) generated by ABR 9 to specify the routing identifier of PE router 10B as a reachable network destination. In general, a Summary-LSA is originated by an ABR for advertisement within an area to describe destinations outside of the area.

In this example, ABR 8 is pre-configured with a default filter of filters 14 that directs ABR 8 to eschew inter-area distribution of routing information to non-backbone routers in the general case. Thus, for example, although ABR 8 will distribute routing information received from PE 10A into backbone 6, ABR 8 in the default case does not export routing information received from backbone 6 into area 4A per the default route. In instances in which AS 2 implements OSPF, for example, the default filter of filters 14 may direct ABR 8 to not export any Summary-LSAs and AS-external LSAs received from backbone 6. An AS-external LSA includes routing information that is imported at an ASBR into OSPF from another routing process and that describes destinations external to the AS. In this sense, area 4A is a stub area in that AS-external LSAs are excluded from the area (as well as Summary-LSAs).

PE router 10A receives a service endpoint identifier for the PE router 10B service endpoint by message 16, which is neither a Summary-LSA nor an AS-external LSA (message 16 may in some cases be a special type of Summary-LSA known as a default Summary-LSA, as described in further detail below). Message 16 in the illustrated example originates from PE router 10B. However, message 16 may in some cases be received from a route reflector with which PE router 10A has a peering session. For example, message 16 may represent a Border Gateway Protocol (BGP) UPDATE message that includes a Network Layer Reachability Information (NLRI) for the service and that further includes a NEXT_HOP attribute that specifies a router identifier for PE router 10B in the form of a loopback (or "local") IP address for the PE router 10B.

In some instances, message 16 represents a configuration message that configures PE router 10A with configuration information that specifies a router identifier for PE router 10B as a service endpoint identifier for one or more services. PE router 10A may be further configured with or may receive from ABR 8 a default route specifying ABR 8 as the advertising router (and therefore IGP next hop in this case) for an destination network that includes the router identifier for PE router 10B. ABR 8 may provide the default route to PE router 10A using a Summary-LSA.

In accordance with techniques described herein, in the event PE router 10A needs to determine a path through AS 2 to the service endpoint represented by PE router 10B, PE router 10A sends request message 22 to ABR 8 to request that ABR 8 provide any routing information received from backbone 6 and associated with the service endpoint identifier. Request message 22 may include the service endpoint identifier. For example, request message 22 may include the router identifier for PE router 10B included in a NEXT_HOP attribute of a BGP UPDATE message that includes an NLRI for the service or as configured in PE router 10A as the service endpoint for the service. Example instances of request message 22 are described more fully below with respect to FIG. 4.

Area border router 8 receives request message 22 and, in response, advertises routing information from its link-state database and associated with the service endpoint identifier within area 4A in response message 24, which PE router 10A receives. In some examples, ABR 8 installs a filter to filters 14 to override the default filter from filters 14 in order to flood routing information associated with the service endpoint identifier specified by the filter to area 4A. The installed filter may represent a new type of opaque LSA received in request message 22 that indicates to ABR 8 to provide routing information associated with the service endpoint identifier area 4A. Again, an example of this new type of opaque LSA is described more fully with respect to FIG. 4.

As a result, PE router 10A receives routing information for PE router 10B to enable PE router 10A to compute a Shortest-Path First (SPF) calculation of a path to PE router 10B. PE router 10A may use the path to forward IP or Label Distribution Protocol (LDP) traffic, for instance, toward the services reachable by PE router 10B. For example, PE router 10A may use the path to request a label-switched path (LSP) label from ABR 8 according to LDP downstream on demand (DoD) and associate a FEC with the label to reach the LDP FEC service endpoint at PE router 10B by an LSP. This technique may be applied to establish a VPLS service instance, for example.

By modifying the link-state push-based flooding mechanism in favor of a pull-based mechanism by which ABR 8 filters area-external routing information for a link state protocol by default but responds to requests for routing information associated with a service endpoint identifier, the techniques may improve route-convergence times and lead to reduced resource consumption by PE router 10A and other internal routers of area 4A while still permitting path computation to area-external routers of interest.

Figure 2:
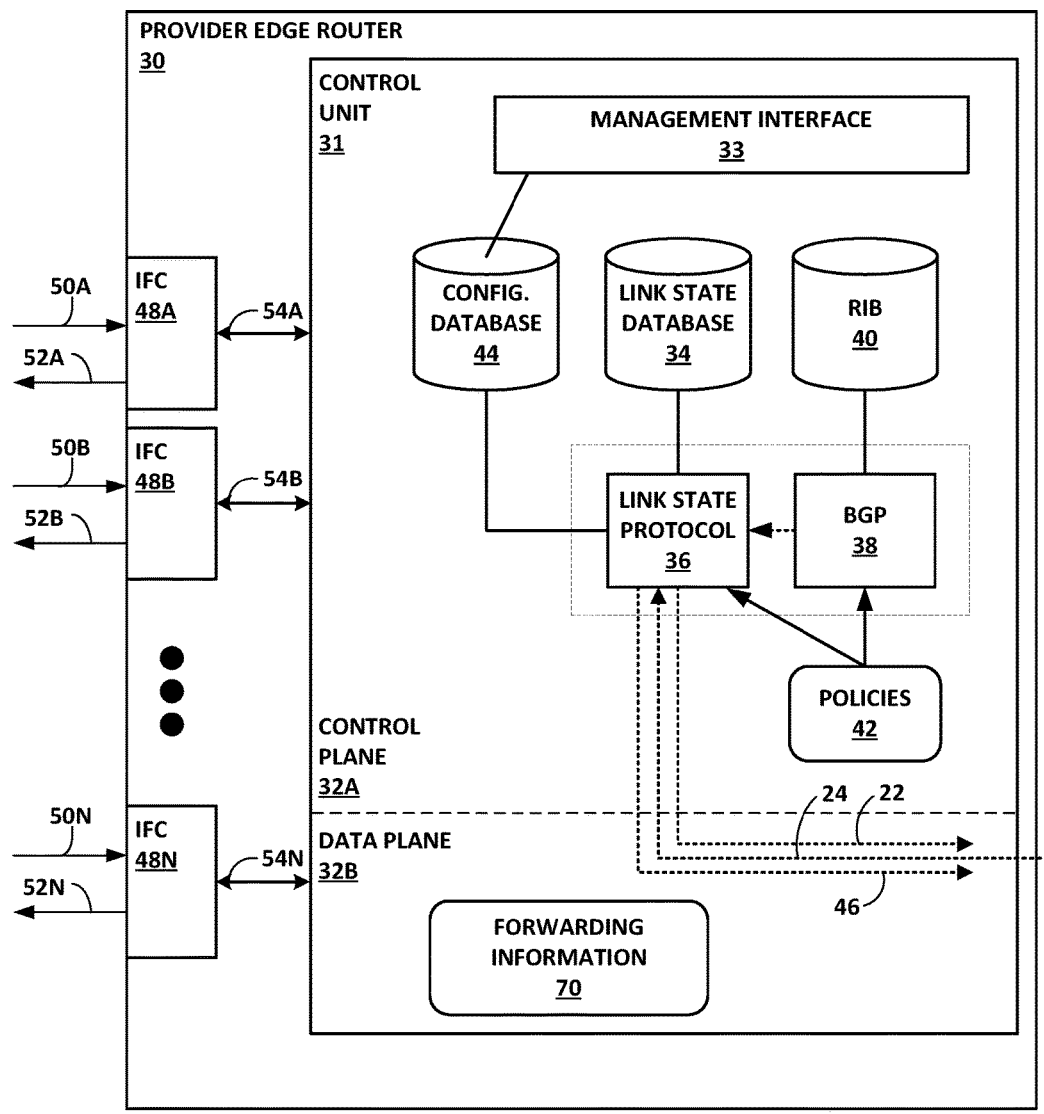
FIG. 2 is a block diagram illustrating example provider edge router that triggers a request to an area border router for link state protocol routing information in accordance with techniques described in this disclosure.

FIG. 2 is a block diagram illustrating example provider edge router 30 ("PE router 30") that triggers a request to an area border router for link state protocol routing information in accordance with techniques described in this disclosure. For purposes of illustration, PE router 30 may be described below within the context of an example of network system 2 of FIG. 1 and may represent at least PE router 10A.

PE router 30 includes a control unit 31 and interface cards 48A-48N ("IFCs 48") coupled to control unit 31 via internal links 54A-54N. Control unit 31 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 31 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 31 is divided into two logical or physical "planes" to include a first control or routing plane 32A ("control plane 32A") and a second data or forwarding plane 32B ("data plane 32B"). That is, control unit 31 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality in conjunction with hardware components.

Control plane 32A of control unit 31 executes the routing functionality of PE router 30. In this respect, control plane 32A represents hardware or a combination of hardware and software of control unit 31 that implements routing protocols link state protocol 36 and BGP 38. Control plane 32A of control unit 31 executes BGP process 38 (hereinafter "BGP 38") to exchange, with BGP peers of PE router 30, inter-domain routing information stored in routing information base 40 ("RIB 40"). RIB 34 may store active prefixes and their related attributes as received by BGP 38 in BGP UPDATE messages. BGP peers of PE router 30 may include one or more route reflectors.

Control plane 32A of control unit 31 also executes link-state protocol process 34 (hereinafter "link-state protocol 34"), which may represent OSPF, IS-IS, or another hierarchical routing protocol that supports dividing a network into separate areas. Link-state protocol 34 receives link-state advertisements (e.g., OSPF LSAs or IS-IS LSPs) from other internal routers of an area in which PE router 30 is logically located and from ABRs having an interface to the area. However, in accordance with techniques described herein, ABRs for the area are configured to eschew flooding link-state advertisements into the area. A single process or respective processes may execute link-state protocol 34 and BGP 38 using the operating environment provided by control unit 31. Because PE router 30 in this instance executes both link-state protocol 34 and BGP 38, PE router 30 may be considered an ASBR and be configured with policies from the set of policies 42 that direct link-state protocol 34 to redistribute routes received via BGP 38 into link-state database 36.

Link-state protocol 34 may resolve the topology defined by routing information in link-state database 36 to determine one or more routes through the link-state protocol 34 domain. Control plane 32A may then update data plane 32B with these routes, where data plane 32B maintains these routes as forwarding information 70. Data plane 32B represents hardware or a combination of hardware and software of control unit 31 that forwards network traffic in accordance with forwarding information 70. In some instances, data plane 32B may include one or more forwarding units, such as packet forwarding engines ("PFEs"), which provide high-speed forwarding of network traffic received by interface cards 48 via inbound links 50A-50N to outbound links 52A-52N.

Control plane 32A further includes management interface 33 by which a network management system or in some instances an administrator using a command line or graphical user interface, configures configuration database to include a default route (e.g., a default-Summary LSA) specifying an ABR as a next hop for area-external destinations. For example, an administrator may configure PE router 30 operating as PE router 10A with a default route specifying ABR 8 as a next hop for area-external destinations including the routing identifier for PE router 10B. An administrator may further configure PE router 30 with a service definition that specifies a service endpoint identifier represented by a router that is external to the link-state protocol area (e.g., OSPF area) in which PE router 30 is logically located.

In some cases, BGP 38 may receive, in a BGP UPDATE message via an Interior BGP (IBGP) peering session with another router of the link-state protocol 36 domain, a service endpoint identifier for a service reachable by the identified service endpoint. The service endpoint identifier may be specified in the BGP UPDATE message as the next hop for the service in the NEXT_HOP attribute, which an IBGP speaker other than a route-reflector sets in accordance with a policy to its loopback address to enable other routers of the domain to resolve the loopback address (other routers may be unable to resolve a next hop that is an interface for a border router for another autonomous system).

In accordance with techniques described in this disclosure, control plane 32A applies a policy from policies 42 that triggers a request message 22 upon receipt (or in some cases storage to RIB 40) of the BGP UPDATE message that includes the service endpoint identifier. Link state protocol 36 generates request message 22 as a request for link state routing information associated the service endpoint identifier and floods request message 22 within the link state area for PE router 30 for receipt by a connected ABR.

Subsequently, the connected ABR responds by flooding the requested routing information to the area for receipt by PE router 30. Link state protocol 36 receives the routing information associated with the service endpoint identifier and stores the routing information to link-state database 34. The routing information may represent an OSPF Summary-LSA that includes the longest prefix match for the service endpoint identifier in the link-state database of the ABR. Link state protocol 36 resolves the routing topology represented by link state database 34 to identify one or more routes to the service endpoint identifier for forwarding, e.g., LDP or IP traffic to the service endpoint.

BGP 38 may subsequently receive a BGP UPDATE message that includes a Withdrawn Routes field specifying a prefix for a route that is being withdrawn from service and that further includes the service endpoint identifier specified in a NEXT_HOP attribute. If RIB 40 no longer includes any routes specifying the service endpoint identifier as a next hop, a policy of policies 42 may trigger link state protocol 36 to withdraw the previous request made by PE router 30 by flooding request message 22 to ABRs of the area.

Link state protocol 36 withdraws the previous request by generating and sending withdraw message 46 that requests ABRs to no longer send routing information associated with the service endpoint identifier. In some cases, withdraw message 46 represents a new type of LSA (corresponding to instances of request 22 that are the new type of LSA) that specifies the service endpoint identifier and further sets a link state age field (LS Age in OSPF LSAs) to a maximum age for the LSA. When received by ABRs of the area, the ABRs will flush the LSA from their respective domains, thereby withdrawing the previous request made using request 22.

For cases in which an administrator configures PE router 30 with a service definition that specifies a service endpoint identifier represented by a router that is external to the link-state protocol area in which PE router 30 is logically located, a policy from policies 42 triggers the request 22 for routing information in a manner similar to that described above with respect to the receipt of a service endpoint identifier via BGP.

Figure 3:
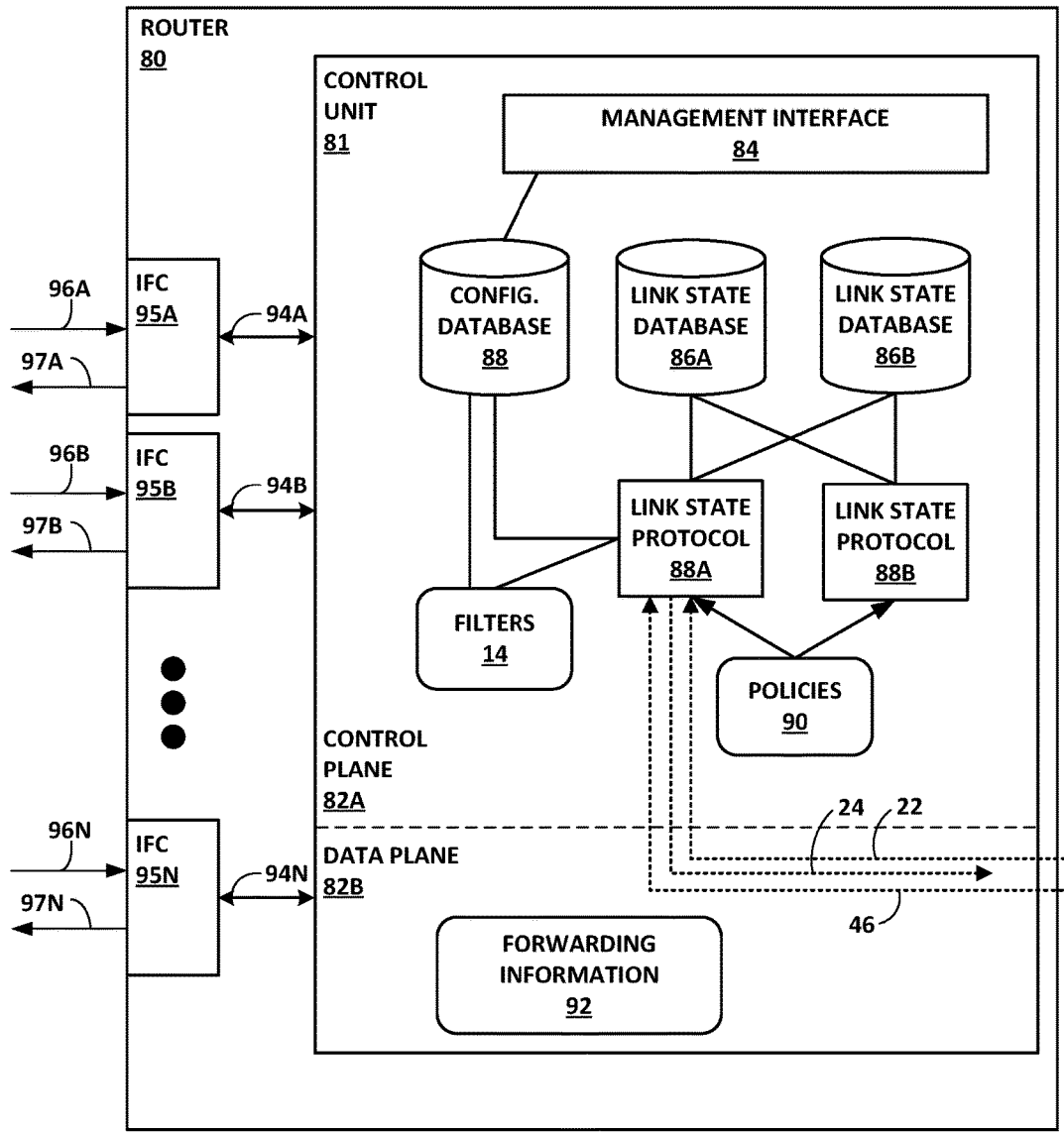
FIG. 3 is a block diagram illustrating an example router that floods link state advertisements including routing information according to a dynamic filter, in accordance with techniques described herein.

FIG. 3 is a block diagram illustrating an example router 80 that floods link state advertisements including routing information according to a dynamic filter, in accordance with techniques described herein. For purposes of illustration, router 80 may be described below within the context of an example of network system 2 of FIG. 1 and may represent at least ABR 8.

PE router 80 includes a control unit 81 and interface cards 95A-95N ("IFCs 95") coupled to control unit 81 via internal links 94A-94N. Control unit 81, IFCs 95, and internal links 94A-94N may be structurally similar to control unit 31, IFCs 48, and links 54A-54N of PE router 30 of FIG. 2.

In this example, control unit 81 is divided into control plane 82A and data plane 82B. Control plane 82A of control unit 81 executes the routing functionality of router 80. In this respect, control plane 32A represents hardware or a combination of hardware and software of control unit 31 that executes link state protocol processes 88A-88B (hereinafter "link-state protocols 88A-88B"), which may represent OSPF, IS-IS, or another hierarchical routing protocol that supports dividing a network into separate areas. Link state protocol 88A receives/sends link-state advertisements (e.g., OSPF LSAs or IS-IS LSPs) from/to area border routers of a backbone area. Link state protocol 88B receives/sends link-state advertisements (e.g., OSPF LSAs or IS-IS LSPs) from/to area border routers of a backbone area. Each of link state protocols 88A-88B is associated with a different one of link state databases 86A-86B, though the link state protocols 88A-88B may import link state advertisements from either of link state databases 86A-86B. A single process or respective processes may execute link state protocols 88A-88B using the operating environment provided by control unit 81.

Link-state protocols 88A-88B may resolve topologies defined by routing information in link-state databases 86A-86B to determine one or more routes through the respective link-state protocol domains. Control plane 32A may then update data plane 32B with these routes, where data plane 32B maintains these routes as forwarding information 70. Router 80 in this respect forwards packets from/to the non-backbone area to/from the backbone area, for which router 80 has respective interfaces.

Data plane 82B represents hardware or a combination of hardware and software of control unit 81 that forwards network traffic in accordance with forwarding information 92. In some instances, data plane 82B may include one or more forwarding units, such as packet forwarding engines ("PFEs"), which provide high-speed forwarding of network traffic received by interface cards 95 via inbound links 96A-96N to outbound links 97A-97N.

Control plane 82A further includes management interface 84 by which a network management system or in some instances an administrator using a command line or graphical user interface, configures configuration database. In accordance with techniques described herein, router 80 is configured so as to not, in the general case, flood link-state advertisements received from the backbone area into the non-backbone area for which router 80 has respective interfaces. Specifically in this example, a filter from filters 14 configured in control unit 81 prevents, in the general case, link state protocol 88B from importing link state advertisements received by link state protocol 88A for flooding to the non-backbone area.

Upon receiving request message 22, link state protocol 88A adds (or modifies the default) filter to filters 14 to allow flooding of routing information received from the backbone area and associated with the service endpoint identifier specified in request message 22. Consequently, link state protocol 88A floods such routing information as is included in link state database 86B to the non-backbone area for receipt by PE router 10A, for instance. Link state protocol 88A may in some instances query link state databases 86A-86B to identify a Summary-LSA that satisfies a longest prefix lookup query for the service endpoint identifier and flood the Summary-LSA to the non-backbone area.

In some instances, request message 22 may include a new type of LSA, in which case link state protocol 88A stores the LSA to link state database 86A. This triggers link state protocol 88A to import the routing information associated with the specified service endpoint identifier from link state database 86B and flood it to the non-backbone area.

Link state protocol 88A may subsequently receive withdraw message 46 that request router 80 to no longer flood routing information associated with the service endpoint identifier into the non-backbone area. In some cases, withdraw message 46 represents a new type of LSA (corresponding to instances of request 22 that are the new type of LSA) that specifies the service endpoint identifier and further sets a link state age field (LS Age in OSPF LSAs) to a maximum age for the LSA. In such cases, link state protocol 88A flushes the LSA from the non-backbone area (including from link state database 86A) and no longer floods routing information for the service endpoint identifier into the non-backbone area to restore the general filtering case.

Figure 4:
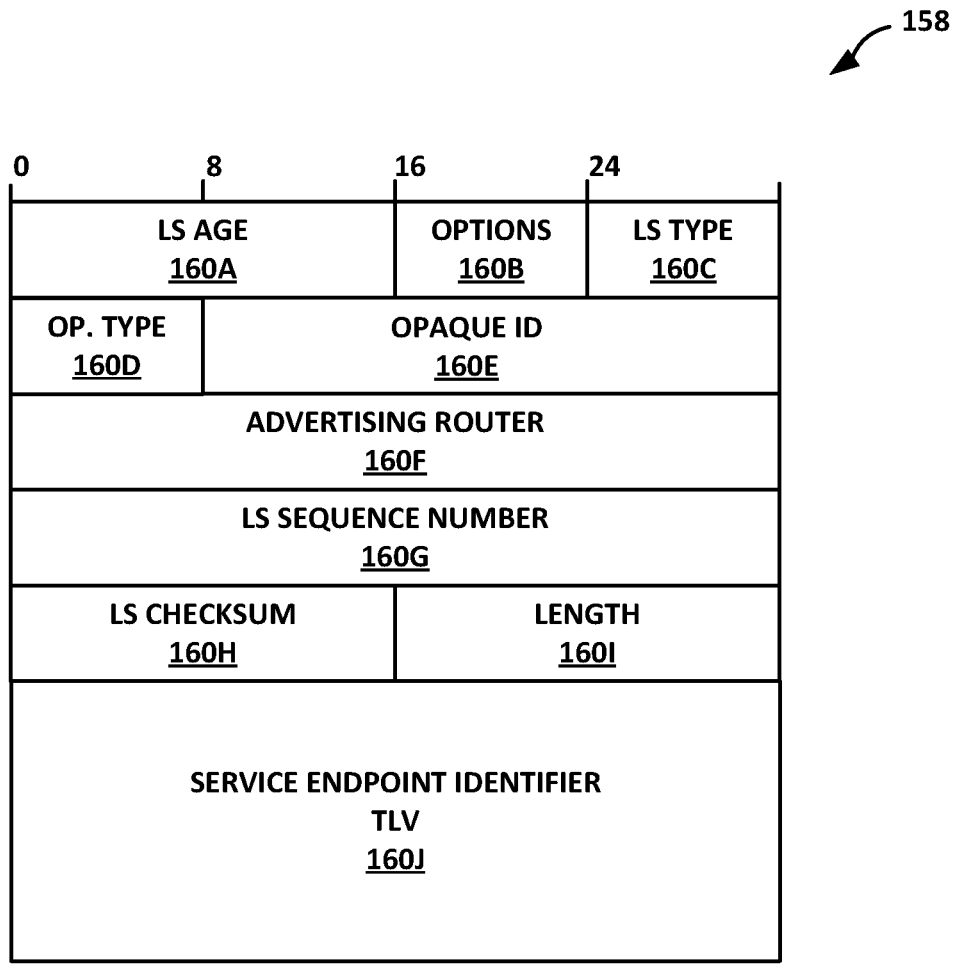
FIG. 4 is an example of a link state message for requesting link state routing information associated with a service endpoint identifier, as described herein.

FIG. 4 is an example of a link state message 158 for requesting link state routing information associated with a service endpoint identifier, as described herein. Link state message 158 may represent any of request messages 22 of FIGS. 1-3. Link state message 158, as shown in the example of FIG. 4, complies with the OSPF protocol in that it adheres to the four byte width limitation specified by the OSPF protocol. That is, link state message 158 has a set of four-byte rows, as reflected in FIG. 4 by the [0 . . . 31] bit range for each row shown at the top of link state message 158.

In addition, link state message 158 conforms in this example to a format for a class of OSPF LSAs referred to as "Opaque LSAs." Opaque LSAs in general, and link state message 158 in particular, includes a standard LSA header followed by application-specific information that may be used directly by OSPF or by another application. Additional details regarding Opaque LSAs are found in "The OSPF Opaque LSA Option," RFC 5250, July 2008, which is incorporated by reference herein.

As shown in FIG. 4, link state message 158 includes link state (LS) age field 160A, options field 160B, and LS type field 160C. LS age field 160A typically specifies the age of the link state message bearing link state message 158 in seconds and is used to distinguish between two link state messages specifying the same link state message sequence number in their respective LS sequence number fields 160G. Options field 160B may specify which optional capabilities are associated with the link state message bearing link state message 158. LS type field 160C indicates the format and function of the link state message bearing link state message 158, i.e., the type of link state message. Opaque LSAs are Type 9, 10, and 11 link state advertisements. The value for LS type field 160C in this example is Type 10 such that the flooding scope is area-local, although other types may be used.

The link-state identifier of link state message 158 is divided into opaque type field 160D and opaque identifier 160E. Opaque type field 160D may specify a registered or unregistered value for a "service endpoint identifier routing information request type" that indicates to receiving routers that link state message 158 requests routing link state routing information associated with a service endpoint identifier.

Link state message 158 also includes advertising router field 160F, link state sequence number field 160G link state checksum field 160H, and length field 160I. Advertising router field 160F specifies the OSPF router identifier of the originator of link state message 158, such as PE router 10A of FIG. 1. LS sequence number field 160G is a signed 32-bit integer used to detect old and duplicate link state messages. LS checksum field 160H may be used to determine whether the link state message accompanying link state message 158 contains errors. Length field 160I indicates the length of link state message 158. Although shown as containing header fields 160A-160I ("header fields 160"), link state message 158 may contain more or fewer header fields 160 in some examples.

In accordance with techniques described herein, link state message 158 further includes service endpoint identifier type-length-value (TLV) field 160J ("SEI TLV 160J") in the opaque information field for the link state message 158. SEI TLV 160J includes a value for a service endpoint identifier, such as a router identifier for PE router 10B of FIG. 1 or another router. The service endpoint identifier value may be an IPv4 or IPv6 loopback or interface address for the device that represents the service endpoint. Although described as a TLV, SEI TLV field 160J may in some instances simply be the value of the service endpoint identifier, e.g., a 32-bit IPv4 address for a router.

An ABR that receives, on an interface for a link state protocol area, link state message 158 may extract the service endpoint identifier included in SEI TLV 160J. Based at least on the determination that opaque type field 160D includes a value that indicates that link state message 158 is a request for routing link state routing information associated with a service endpoint identifier, the ABR floods such routing information for the extracted service endpoint identifier to the area.

Figure 5:
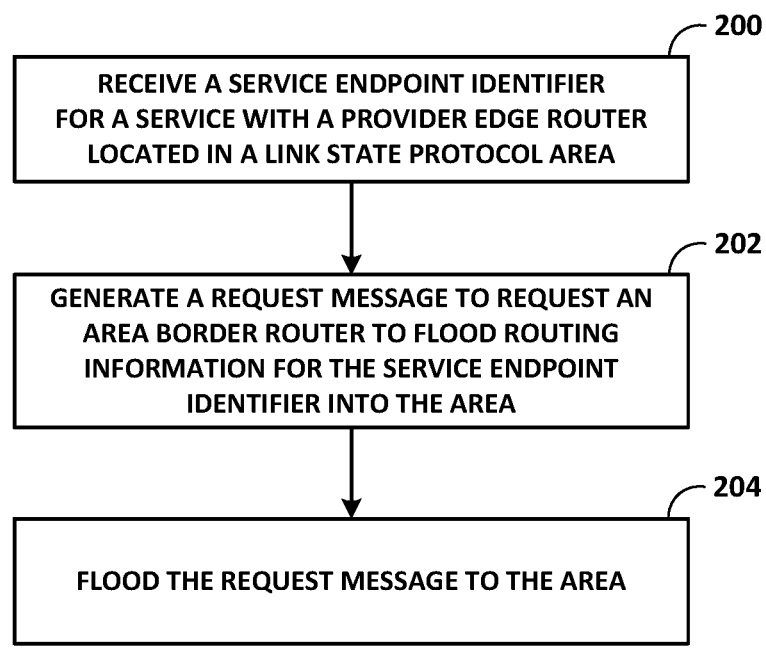
FIG. 5 is a flowchart illustrating an example mode of operation for a provider edge router to request routing information associated with a service endpoint identifier according to techniques described in this disclosure.

FIG. 5 is a flowchart illustrating an example mode of operation for a provider edge router to request routing information associated with a service endpoint identifier according to techniques described in this disclosure. The mode of operation is described with respect to PE router 10A of FIG. 1.

PE router 10A receives, e.g., via a BGP peering session or a configuration message, a service endpoint identifier for a service that is reachable by a remote PE router 10B that is logically located external to the link state protocol area in which PE router is logically located (200). Although ABR 8 may be configured to prevent flooding of Summary-LSAs and AS-external LSAs from backbone 6 into area 4A, PE router 10A generates a request message 22 to request ABRs, e.g., ABR 8, to flood Summary-LSAs for the service endpoint identifier into area 4A (202). PE router 10A flood the request message 22 to area 4A for receipt by ABR 8 (204).

Figure 6:
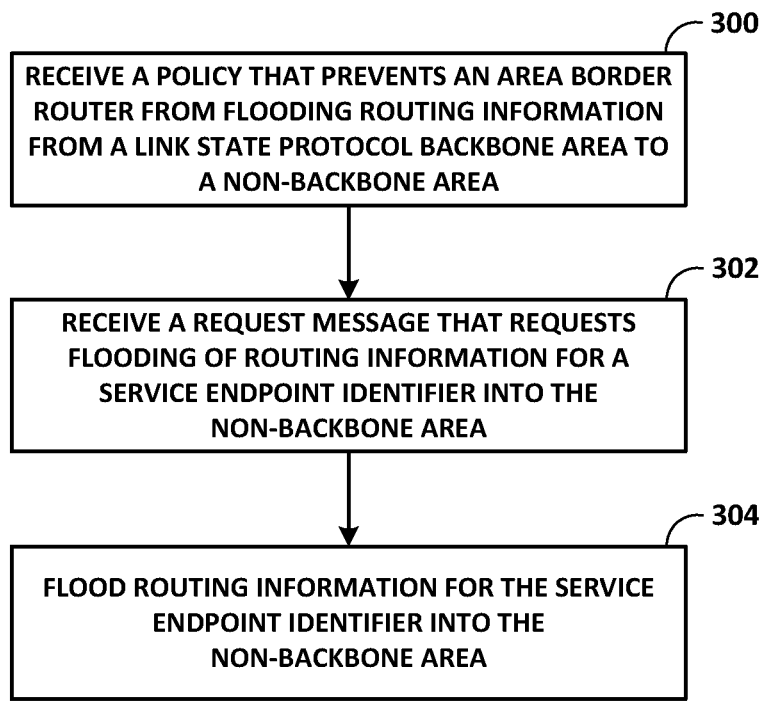
FIG. 6 is a flowchart illustrating an example mode of operation for a router operating as an area border router to dynamically filter routing information associated with a service endpoint identifier according to techniques described in this disclosure.

FIG. 6 is a flowchart illustrating an example mode of operation for a router operating as an area border router to dynamically filter routing information associated with a service endpoint identifier according to techniques described in this disclosure. The mode of operation is described with respect to ABR 8 of FIG. 1.

Initially, ABR 8 is pre-configured with a policy, or is in some cases statically configured or otherwise pre-programmed with default operation, to prevent flooding of routing information received from backbone 6 into non-backbone area 4A (300). ABR 8 receives request message 22 requesting ABR 8 to flood Summary-LSAs for a service endpoint identifier into area 4A (302). In response to the request message 22, ABR 8 adds a filter to filters 14 to dynamically enable flooding of any Summary-LSAs the service endpoint identifier into area 4A (304).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising: receiving, by an area border router that borders a backbone area and a non-backbone area of a multi-area autonomous system that employs a hierarchical link state routing protocol to administratively group routers of the autonomous system into areas, a request message from the non-backbone area that requests the area border router to provide routing information associated with a service endpoint identifier to the non-backbone area, wherein the request message specifies the service endpoint identifier and the routing information comprises link state information associated with the service endpoint identifier;
  adding or reconfiguring, by the area border router in response to the request message, a filter associated with the link state routing protocol to specify the service endpoint identifier; and
  sending, by the area border router according to the filter, the routing information associated with the service endpoint identifier to the non-backbone area.

2. The method of claim 1, wherein the request message identifies a router of the non-backbone area as an originating router of the request message.

3. The method of claim 1, further comprising:
  receiving, by the area border router from the backbone area and prior to receiving the request message, the routing information associated with the service endpoint identifier; and
  storing, by the area border router, the routing information associated with the service endpoint identifier to a link state database without sending the routing information associated with the service endpoint identifier to the non-backbone area.

4. The method of claim 1, wherein the request message comprises an Opaque Link State Advertisement (LSA) that conforms to an Open Shortest Path First (OSPF) routing protocol and includes, in an opaque information field, the service endpoint identifier.

5. The method of claim 1, wherein the service endpoint identifier comprises one of a router identifier, a loopback IPv4 address, or an interface IPv4 address of a router.

6. The method of claim 1, wherein the request message comprises a Link State Advertisement (LSA), the method further comprising:
  storing, by the area border router, the LSA to a link-state database;

receiving, by the area border router from the backbone area and subsequent to receiving the request message, additional routing information associated with the service endpoint identifier; and sending the additional routing information to the non-backbone area based at least on the LSA stored to the link-state database.

7. The method of claim 1, wherein the request message comprises a Link State Advertisement (LSA), the method further comprising:

storing, by the area border router, the LSA to a link-state database;

receiving, by the area border router from the non-backbone area, a withdraw message to withdraw the LSA;

in response to receiving the withdraw message and by the area border router, deleting the LSA from the link-state database; and receiving, by the area border router from the backbone area and subsequent to receiving the withdraw message, additional routing information associated with the service endpoint identifier;

storing, by the area border router, the additional routing information associated with the service endpoint identifier to a link state database without sending the additional routing information associated with the service endpoint identifier to the non-backbone area.

8. A router comprising:

a control unit comprising a processor and a memory that stores instructions for a management interface and a link state protocol module; and a network interface card, wherein the management interface is configured for execution by the control unit to receive configuration information that configures the router to operate as an area border router that borders a backbone area and a non-backbone area of a multi-area autonomous system that employs a hierarchical link state routing protocol to administratively group routers of the autonomous system into areas; and wherein the link state protocol module is configured for execution by the control unit to receive a request message from the non-backbone area that requests the area border router to provide routing information associated with a service endpoint identifier to the non-backbone area, wherein the request message specifies the service endpoint identifier and the routing information comprises link state information associated with the service endpoint identifier, wherein the link state protocol module is further configured to add or reconfigured, in response to the request message, a filter associated with the link state routing protocol to specify the service endpoint identifier, and wherein the link state protocol module is further configured to send according to the filter and via the network interface card, the routing information associated with the service endpoint identifier to the non-backbone area.

9. The router of claim 8, wherein the link state protocol module is further configured to receive, from the backbone area and prior to receiving the request message, the routing information associated with the service endpoint identifier, and wherein the link state protocol module is further configured to store the routing information associated with the service endpoint identifier to a link state database without sending the routing information associated with the service endpoint identifier to the non-backbone area.

10. The router of claim 8, wherein the request message comprises a Link State Advertisement (LSA), wherein the link state protocol module is further configured to store the LSA to a link-state database, wherein the link state protocol module is further configured to receive, from the backbone area and subsequent to receiving the request message, additional routing information associated with the service endpoint identifier, and wherein the link state protocol module is further configured to send the additional routing information to the non-backbone area based at least on the LSA stored to the link-state database.

11. The router of claim 8, wherein the request message comprises an Opaque Link State Advertisement (LSA) that conforms to an Open Shortest Path First (OSPF) routing protocol and includes, in an opaque information field, the service endpoint identifier.

12. The router of claim 11, wherein:

the Opaque LSA comprises a first Opaque LSA; and the link state protocol module is further configured to receive a withdraw message to withdraw the request message, wherein the withdraw message comprises a second Opaque LSA that includes a link state age field set to a maximum age for the second Opaque LSA.

13. The router of claim 8, wherein the service endpoint identifier comprises one of a router identifier, a loopback IPv4 address, or an interface IPv4 address of the remote router.

14. The router of claim 8, wherein the request message identifies a router of the non-backbone area as an originating router of the request message.

15. The router of claim 8:

wherein the request message comprises a Link State Advertisement (LSA), wherein the link state protocol module is further configured to store the LSA to a link-state database, wherein the link state protocol module is further configured to receive, from the non-backbone area, a withdraw message to withdraw the LSA, wherein the link state protocol module is further configured to, in response to receiving the withdraw message, delete the LSA from the link-state database; and wherein the link state protocol module is further configured to receive, from the backbone area and subsequent to receiving the withdraw message, additional routing information associated with the service endpoint identifier, and wherein the link state protocol module is further configured to store the additional routing information associated with the service endpoint identifier to a link state database without sending the additional routing information associated with the service endpoint identifier to the non-backbone area.

16. A non-transitory computer-readable medium comprising instructions for causing one or more programmable processors to:

receive, by an area border router that borders a backbone area and a non-backbone area of a multi-area autonomous system that employs a hierarchical link state routing protocol to administratively group routers of the autonomous system into areas, a request message from the non-backbone area that requests the area border router to provide routing information associated with a service endpoint identifier to the non-backbone area, wherein the request message specifies the service endpoint identifier and the routing information comprises link state information associated with the service endpoint identifier;

add or reconfigure, by the area border router in response to the request message, a filter associated with the link state routing protocol to specify the service endpoint identifier; and send, by the area border router according to the filter, the routing information associated with the service endpoint identifier to the non- backbone area.

* * * * *